Jan. 19, 1926.  
C. B. KURTZ  
1,570,066  
BRAKE ACTUATING MEANS FOR MOTOR CARS  
Filed Oct. 26, 1921
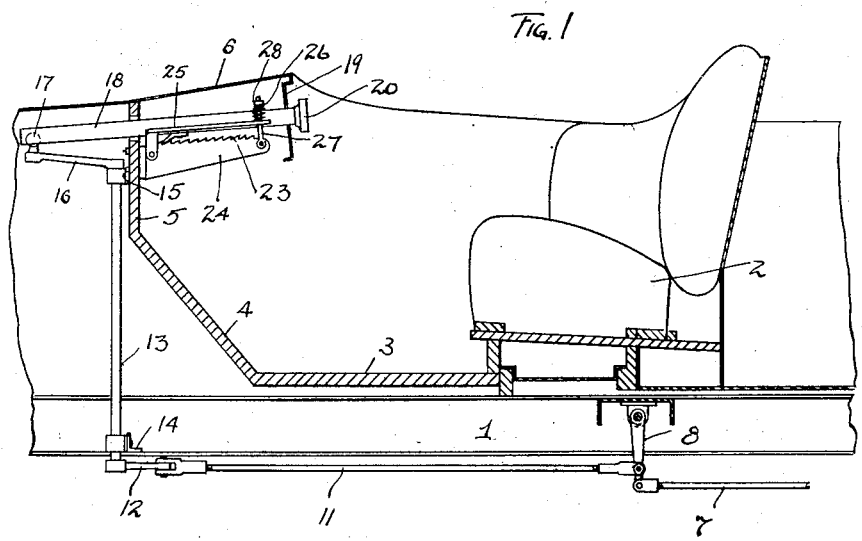
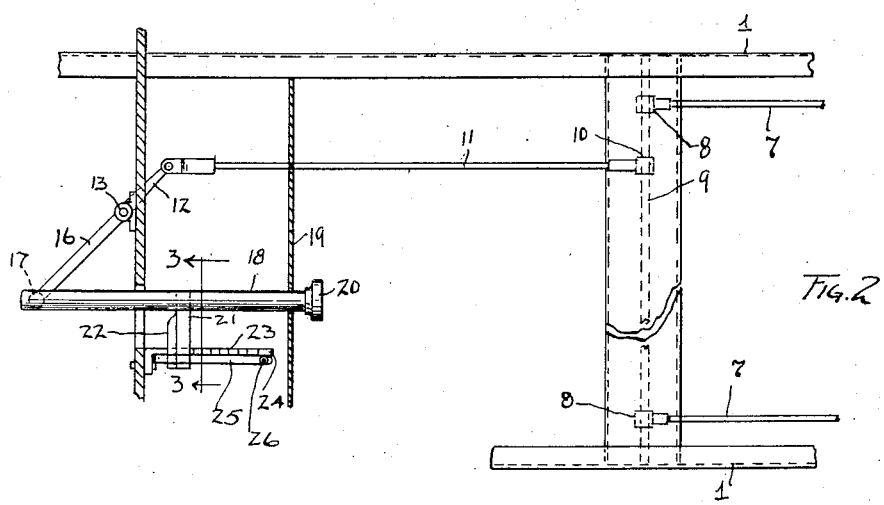
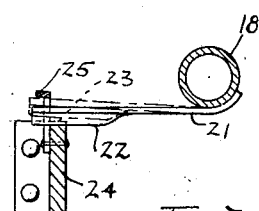
Inventor  
Cyrus B. Kurtz  
By Day, Oberlin & Day  
Attorneys Patented Jan. 19, 1926.

1,570,066

UNITED STATES PATENT OFFICE.

CYRUS B. KURTZ, OF LAKEWOOD, OHIO.

BRAKE ACTUATING MEANS FOR MOTOR CARS.

Application filed October 26, 1921. Serial No. 510,599.

*To all whom it may concern:*

Be it known that I, CYRUS B. KURTZ, a citizen of the United States, and a resident of Lakewood, county of Cuyahoga, and State of Ohio, have invented a new and useful Improvement in Brake-Actuating Means for Motor Cars, of which the following is a specification, the principle of the invention being herein explained and the best mode in which I have contemplated applying that principle, so as to distinguish it from other inventions.

The present improvements, relating, as indicated, to brake actuating means for motor cars, are more particularly directed to the provision of an improved operating means or lever for the brake mechanism which is constructed to permit of its mounting through the dash board of the car in order to remove the brake lever from the front compartment of the car, and in this way facilitate the entrance to, and exit from, this compartment by the occupants. While the present invention is particularly adapted for cars in which the gear shift lever is eliminated, and some other means for effecting the shifting of the gears in the transmission is used, since then only can an entirely clear front compartment be secured, it may also be used on cars having the usual gear shift lever in the center or at the side of the front compartment. A further object of the invention is the provision of such a mechanism mounted as described above which shall be convenient to operate.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a partial longitudinal section through the body and frame of a motor driven vehicle showing the mounting and construction of my improved brake operating mechanism; Fig. 2 is a plan view showing the brake operating member and connections; and Fig. 3 is a section on the line 3—3, in Fig. 2.

In Fig. 1 I have shown the frame 1 of a motor driven vehicle, upon which is mounted the front seat 2, the floor boards 3 and 4 and the dashboard 5, which, together with the body 6 enclose and constitute the front or driver's compartment of a motor vehicle. It is customary to dispose the brake operating lever, usually termed the emergency brake, in the center of the floor board 3, although it is sometimes placed at one side of the compartment.

In the present construction I employ the usual brake pull rods 7, which are attached to the links 8 carried on a bracket operating cross shaft 9, to which there is also attached a link 10, from which there extends forwardly a brake actuating rod or member 11. This brake actuating member 11, which is ordinarily connected to the lower end of the pivoted substantially vertical brake lever mounted in the floor boards 3 of the car, is in the present construction connected to a link 12 mounted on the lower end of the vertically disposed shaft 13. This shaft 13 is mounted in suitable brackets 14 and 15, of which the first named is attached to the frame, while the other bracket 15 is attached to the forward side of the dash 5. The upper end of the lever 13 carries an arm 16 provided with a ball 17, which is pivotally received in the end of a brake actuating member 18. This member 18 is the member which is operated directly by the user to control the brake operating mechanism. It passes through a slot formed in the dash 5, and then through a second slot or opening formed in the cowl board 19 where it is provided with a suitable handle 20.

The member 18 is so mounted on the ball 17 that it may be rocked about a substantially horizontal axis for the purpose now to be described. It is also provided with a lateral extending strip 21, which is provided with a downwardly extending surface 22, which serves as a pawl to engage in ratchet teeth 23 formed on a metal strip 24 which is attached on the rear side of the dash, and is practically concealed between the dash and cowl 19. This pawl 22 is normally maintained in engagement with the ratchet teeth 23 by means of a pivot arm 25 which is pressed downwardly by a spring 26, mounted about a bolt 27 between the strip 25 and the retaining nut 28. All of the mechanism just described is concealed between the dash and the cowl and does not show from the front seat.

The brake mechanism is in the inoperative condition in Figs. 1 and 2, and if the brake is to be set the handle 20 is pulled toward the occupant of the front seat, and as soon as released is held in that position by the pawl 22 engaging the ratchet teeth 23. The operation of this brake member is extremely convenient for the operator since it requires merely a straight pull back on the handle 20, the pawl automatically engaging the ratchet teeth and seating brake as soon as the handle is released. The various arms and links which are used in the connections between the handle and the brake pull rod 7 are so proportioned as to give the operator the same leverage as is ordinarily obtained in brake mechanism, having the brake lever mounted in the center of the floor boards. To release the brake the handle 20 is turned to the right a slight distance, which need only be enough to lift the pawl 22 out of engagement with the ratchet teeth, after which the handle may be returned to its original position and released. The spring pressed arm 25 then oscillates the handle member to its original position, bringing the pawl 22 again into engagement with the ratchet teeth 23.

The present brake operating means are extremely convenient to operate, are but slightly more complicated in their construction and mounting than the present brake operating lever, while the construction and disposition of the present means permit the floor boards of the front compartment to be kept entirely clear, in this way greatly facilitating the entrance to, and exit from, this compartment, and rendering it considerably more comfortable in use.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a motor car, the combination with a movable brake actuating member, of a rod mounted in the dash and instrument boards of the car, a pivoted shaft having connection with said actuating member and said rod, a rack mounted between said dash and instrument boards adjacent to the path of movement of said rod, and a spring-pressed pawl on said rod, said pawl normally engaging said rack and maintaining said rod against movement.

2. In a motor car, the combination with a movable brake actuating member, of a rod mounted in the dash and instrument boards of the car, connections between said rod and said brake actuating member, said connections including a ball joint connection with said rod, a rack mounted between said dash and instrument boards, and means carried with said rod and adapted to normally engage said rack, said ball connection of said rod permitting turning of the same to release said means from engagement with said rack.

3. In a motor car, the combination with a movable brake actuating member, of a rod mounted in the dash and instrument boards of the car, connections between said rod and said brake actuating member, said connections including a ball joint connection with said rod, a rack mounted between said dash and instrument boards, a pawl carried on said rod, said pawl normally engaging in said rack, such ball connection of said rod permitting turning of the same to release said pawl from said rack, and spring means adapted to return said rod to its normal position and to re-engage said pawl and rack upon release of said rod by the operator.

4. In a motor car, the combination of drivers and motor compartments and a dash board partition therebetween, braking means for said car, a brake operating member mounted to be longitudinally movable through said dashboard, said member being also oscillatory about a substantially longitudinal horizontal axis, and an operating handle on one end of said member, means connecting the other end of said member to said brake means, and means adapted to lock said brake operating member in longitudinal position upon oscillation thereof.

5. In a motor car, the combination of drivers and motor compartments and a dash board partition therebetween, braking means for said car, a brake operating member mounted to be longitudinally movable through said dash board, said member being also oscillatory about a substantially longitudinal horizontal axis and an operating handle on one end of said member, means connecting the other end of said member to said brake means, a member provided with rack teeth arranged parallel with said brake operating member, and means on said brake operating member adapted to engage said teeth upon oscillation thereof to lock said latter member in adjusted longitudinal position.

Signed by me, this 30th day of March, 1921.

CYRUS B. KURTZ.